(12) United States Patent
Rajib et al.

(10) Patent No.: US 11,006,363 B2
(45) Date of Patent: May 11, 2021

(54) SYSTEM AND METHOD FOR DYNAMIC ADJUSTMENT OF TARGET WAKE TIME SERVICE PERIOD INTERVALS

(71) Applicant: Samsung Electronics Co., Ltd., Suwon-si (KR)

(72) Inventors: Md Majharul Islam Rajib, San Jose, CA (US); Tianyu Wu, Fremont, CA (US); Wook Bong Lee, San Jose, CA (US); Ashok Ranganath, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 96 days.

(21) Appl. No.: 16/401,503

(22) Filed: May 2, 2019

(65) Prior Publication Data

US 2020/0267644 A1    Aug. 20, 2020

Related U.S. Application Data

(60) Provisional application No. 62/807,692, filed on Feb. 19, 2019.

(51) Int. Cl.
*H04W 52/02* (2009.01)
*H04W 74/08* (2009.01)

(52) U.S. Cl.
CPC ... *H04W 52/0216* (2013.01); *H04W 52/0248* (2013.01); *H04W 74/085* (2013.01)

(58) Field of Classification Search
CPC ......... H04W 52/0216; H04W 52/0248; H04W 52/0209; H04W 74/085; H04W 74/006; H04W 74/0808; H04W 28/0221; Y02D 30/70
See application file for complete search history.

(56) References Cited

U.S. PATENT DOCUMENTS

| | | | |
|---|---|---|---|
| 7,570,613 B2 | 8/2009 | Benveniste | |
| 7,881,322 B1* | 2/2011 | Benveniste | H04W 52/0216 370/414 |
| 9,326,234 B2 | 4/2016 | Chu et al. | |
| 9,363,752 B2 | 6/2016 | Jafarian et al. | |
| 2009/0279464 A1 | 11/2009 | Kakani et al. | |
| 2013/0329576 A1* | 12/2013 | Sinha | H04W 52/0229 370/252 |
| 2016/0345266 A1* | 11/2016 | Park | H04W 52/0235 |
| 2017/0353921 A1 | 12/2017 | Li et al. | |
| 2018/0027453 A1 | 1/2018 | Viger et al. | |
| 2019/0387539 A1* | 12/2019 | Finkelstein | H04W 72/14 |

* cited by examiner

*Primary Examiner* — Curtis A Alia
(74) *Attorney, Agent, or Firm* — Lewis Roca Rothgerber Christie LLP

(57) ABSTRACT

A method for communicating over a WiFi channel. In some embodiments, the method includes determining, by a non-access point station, that a first skipping criterion is met; in response to determining that the first skipping criterion is met, skipping N1 target wait time service periods, N1 being a positive integer; after skipping N1 target wait time service periods, determining, by the non-access point station, whether a second skipping criterion is met; and in response to determining that the second skipping criterion is met, skipping N2 subsequent target wait time service periods, N2 being a positive integer greater than N1.

18 Claims, 12 Drawing Sheets

Unannounced TWT with flexible SPs where SPs are skipped adaptively

Input: No. of SPs skipped previously, AP and STA buffer status, Max no. of Skip
Output: No. of SPs to be skipped next
Algorithm:
If AP and STA buffer is empty then
    If No. of SPs skipped previously == 0 then
        Return 1;
    End
    No. of SPs to skip ← No. of SPs skipped previously * 2
    If No. of SPs to skip > Max no. of Skip then
        No. of SPs to skip ← Max no. of Skip
    End
Else
    No. of SPs to skip = 0;
End
Return No. of SPs to skip

*FIG. 3*

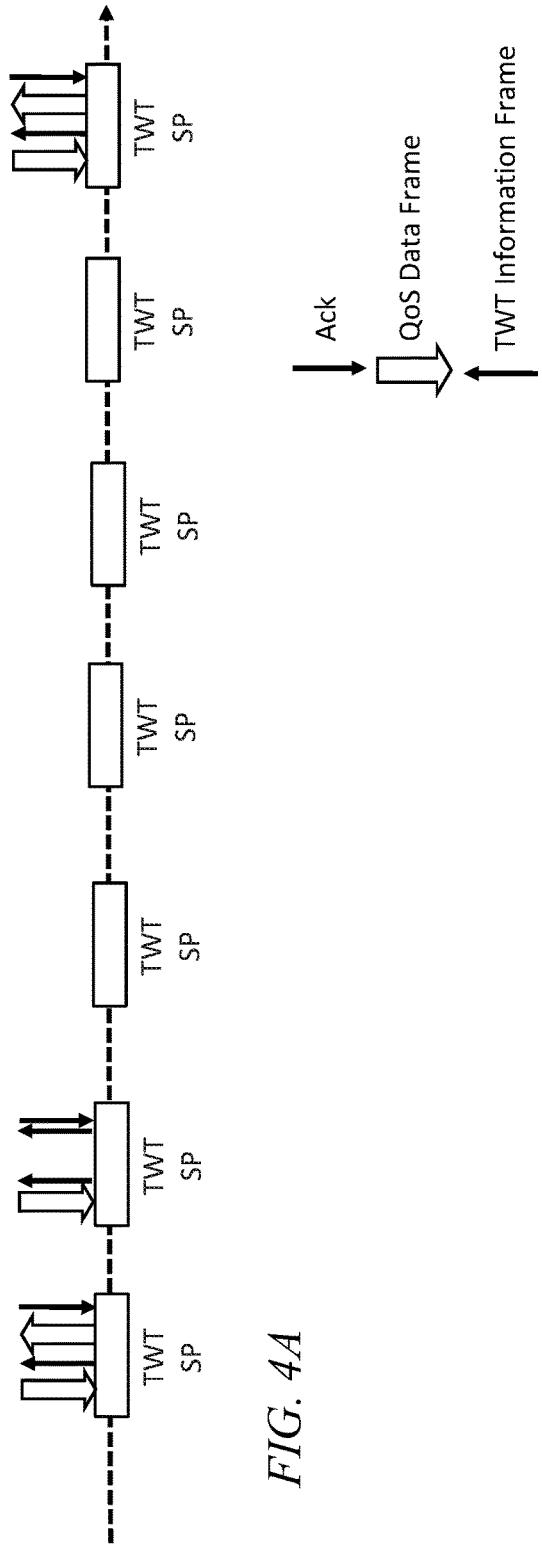
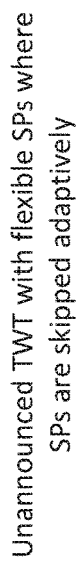
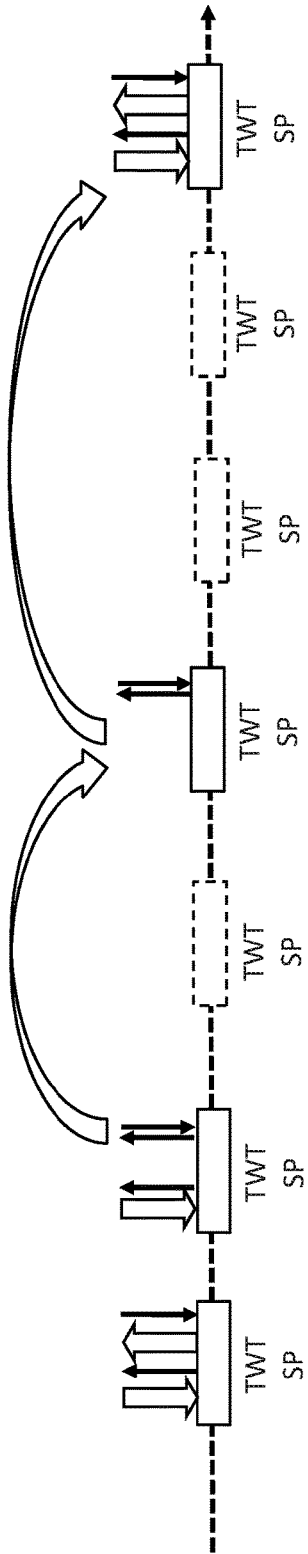
FIG. 4A
FIG. 4C
FIG. 4B

SYSTEM AND METHOD FOR DYNAMIC ADJUSTMENT OF TARGET WAKE TIME SERVICE PERIOD INTERVALS

CROSS-REFERENCE TO RELATED APPLICATION(S)

The present application claims priority to and the benefit of U.S. Provisional Application No. 62/807,692, filed Feb. 19, 2019, entitled "SYSTEM AND METHOD FOR ADAPTIVE DYNAMICALLY ADJUSTING TARGET WAKE TIME (TWT) SERVICE PERIOD (SP)", the entire content of which is incorporated herein by reference.

FIELD

One or more aspects of embodiments according to the present disclosure relate to wireless communications, and more particularly to a system and method for managing target wake time service period intervals.

BACKGROUND

In Wi-Fi systems, target wake time (TWT) enables stations (STAs) to periodically schedule and manage their activities at specific intervals called service periods (SP). This reduces contention and may save power by letting non-access point (non-AP) STAs sleep outside of the SPs. However, in some systems, even if no there is no traffic, the non-AP STAs wake up at every SP and waste power by idle listening. This unproductive power consumption may be high when there is no traffic activity for long periods of time or when the SP durations are long.

SUMMARY

According to some embodiments, there is provided a method for communicating over a WiFi channel, the method including: determining, by a non-access point station, that a first skipping criterion is met; in response to determining that the first skipping criterion is met, skipping N1 target wait time service periods, N1 being a positive integer; after skipping N1 target wait time service periods, determining, by the non-access point station, whether a second skipping criterion is met; and in response to determining that the second skipping criterion is met, skipping N2 subsequent target wait time service periods, N2 being a positive integer greater than N1.

In some embodiments, the second skipping criterion is the same as the first skipping criterion.

In some embodiments, the method further includes, after skipping N2 target wait time service periods: determining, by the non-access point station, whether the second skipping criterion is met; and in response to determining that the second skipping criterion is met, skipping N3 subsequent target wake time service periods, N3 being a positive integer greater than N2, N3/N2 being between 0.5 N2/N1 and 4 N1/N2.

In some embodiments, N2/N1 is 2.

In some embodiments, the determining, by the non-access point station, that the first skipping criterion is met, includes: determining, by the non-access point station, whether a third skipping criterion is met; in response to determining that the third skipping criterion is met, sending, by the non-access point station to an access point station, a target wake time information frame, notifying the access point station that N1 target wake time service periods are to be skipped; and receiving, by the non-access point station, an acknowledgment, from the access point station, for the target wake time information frame.

In some embodiments, the method further includes, receiving, from an access-point station, an indication of buffer status of the access-point station, wherein the determining, by the non-access point station, whether the third skipping criterion is met, includes: determining whether all enhanced distributed channel access buffers of the non-access point station are empty, and determining whether the buffer status of the access-point station indicates that the access point station has no buffered units.

In some embodiments, the indication of buffer status of the access-point station is a value of a more data bit in a quality of service data frame header.

In some embodiments, the indication of buffer status of the access-point station is a value of a more data bit in a quality of service data frame header.

In some embodiments, the method further includes receiving, from the access point station, a quality of service data frame having an end of service period bit set to 1.

In some embodiments, the method further includes waiting, by the non-access point station, until a point in time preceding a current service period end by a maximum amount of time required for a target wake time frame exchange, before the determining whether all enhanced distributed channel access buffers of the non-access point station are empty.

In some embodiments, the determining, by the non-access point station, whether the third skipping criterion is met, includes: at a point in time preceding a current service period end by a maximum amount of time required for a target wake time frame exchange, determining: determining whether all enhanced distributed channel access buffers of the non-access point station are empty; and during a preceding time interval: the channel has been clear, and no quality of service data frames have been received from the access point station.

In some embodiments, the preceding time interval has a length less than the sum of: an arbitration inter-frame spacing for background, and the product of: a maximum contention window length for background and a slot time.

According to some embodiments, there is provided a system for communicating over a WiFi channel, the system including a non-access point station including a processing circuit, the processing circuit being configured to: determine that a first skipping criterion is met; in response to determining that the first skipping criterion is met, skip N1 target wait time service periods, N1 being a positive integer; after skipping N1 target wait time service periods, determine whether a second skipping criterion is met; and in response to determining that the second skipping criterion is met, skip N2 subsequent target wait time service periods, N2 being a positive integer greater than In some embodiments, the second skipping criterion is the same as the first skipping criterion.

In some embodiments, the processing circuit is further configured to: after skipping N2 target wait time service periods, determine whether the second skipping criterion is met; and in response to determining that the second skipping criterion is met, skip N3 subsequent target wake time service periods, N3 being a positive integer greater than N2, N3/N2 being between 0.5 N2/N1 and 4 N1/N2.

In some embodiments, N2/N1 is 2.

In some embodiments, the determining that the first skipping criterion is met, includes: determining whether a third skipping criterion is met; in response to determining that the third skipping criterion is met, sending to an access point station a target wake time information frame, notifying the access point station that N1 target wake time service periods are to be skipped; and receiving an acknowledgment, from the access point station, for the target wake time information frame.

In some embodiments, the processing circuit is further configured to receive, from an access-point station, an indication of buffer status of the access-point station, wherein the determining whether the third skipping criterion is met includes: determining whether all enhanced distributed channel access buffers of the non-access point station are empty, and determining whether the buffer status of the access-point station indicates that the access point station has no buffered units.

In some embodiments, the indication of buffer status of the access-point station is a value of a more data bit in a quality of service data frame header.

According to some embodiments, there is provided a method for communicating over a WiFi channel, the method including: determining, by a non-access point station, that a first skipping criterion is met; in response to determining that the first skipping criterion is met, switching from a first target wake time agreement to a second target wake time agreement, different from the first target wake time agreement; determining, by the non-access point station, whether a second skipping criterion is met; and in response to determining that the second skipping criterion is met, switching from the second target wake time agreement to a third target wake time agreement, the third target wake time agreement being different from the first target wake time agreement, and the third target wake time agreement being different from the first target wake time agreement, wherein the determining that the first skipping criterion is met includes determining that a change in traffic processed by the non-access point station has occurred.

BRIEF DESCRIPTION OF THE DRAWINGS

These and other features and advantages of the present disclosure will be appreciated and understood with reference to the specification, claims, and appended drawings wherein:

FIG. 3 is a pseudocode listing, according to an embodiment of the present disclosure;

FIG. 4A is a target wake time service period timeline, according to an embodiment of the present disclosure;

FIG. 4B is a target wake time service period timeline, according to an embodiment of the present disclosure;

FIG. 4C is a legend for FIGS. 4A and 4B, according to an embodiment of the present disclosure;

DETAILED DESCRIPTION

The detailed description set forth below in connection with the appended drawings is intended as a description of exemplary embodiments of a system and method for managing target wake time service period intervals provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
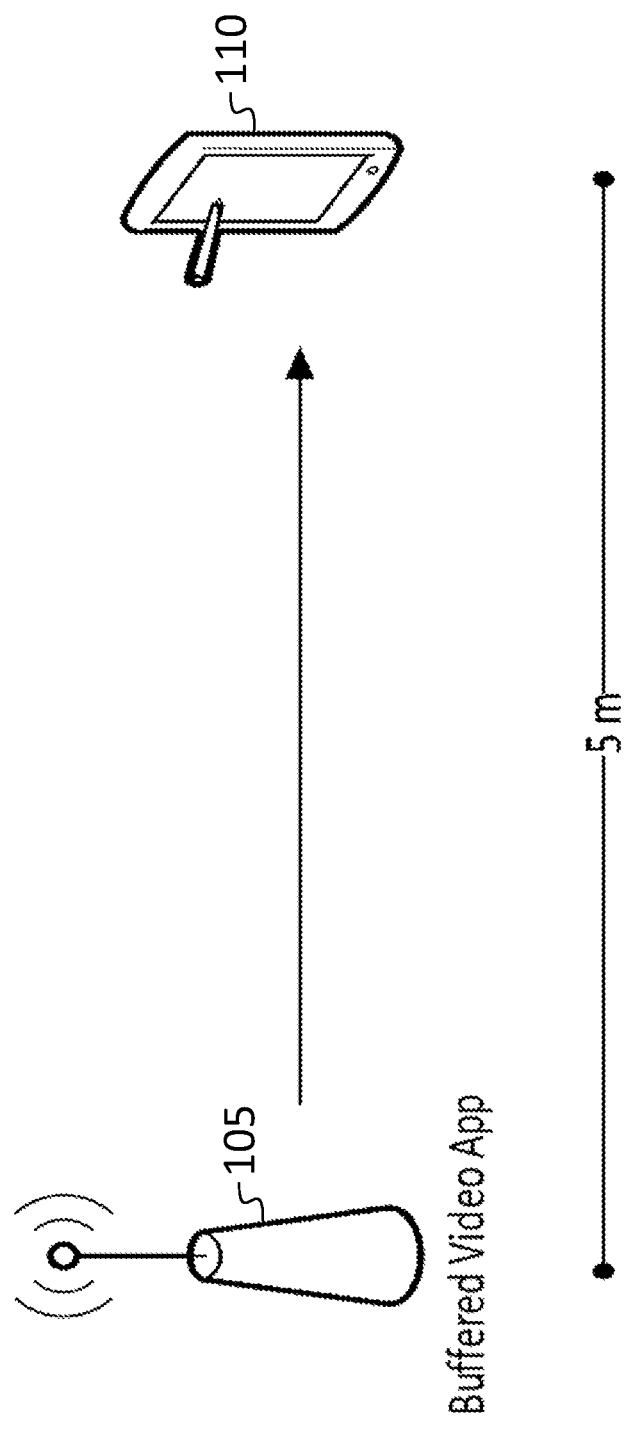
FIG. 1 is a network setup diagram, according to an embodiment of the present disclosure.
Figure 2:
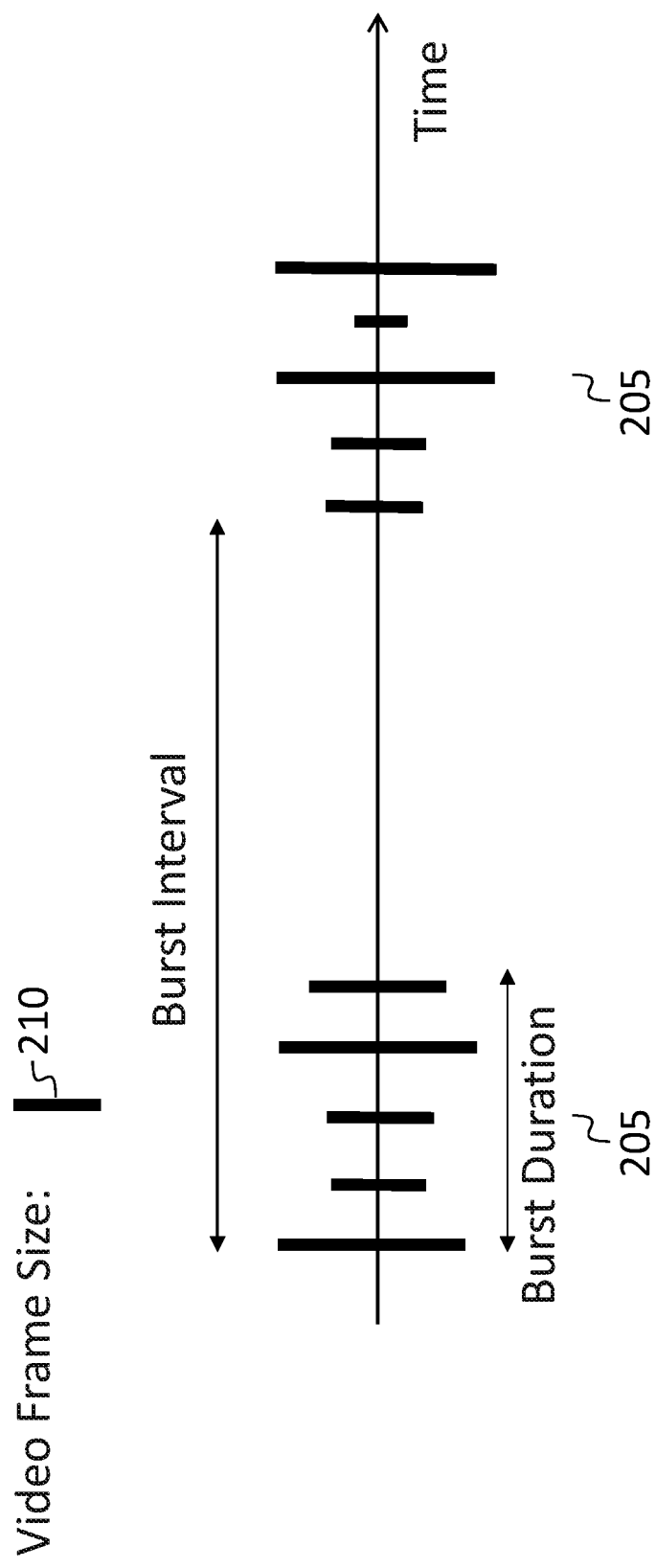
FIG. 2 is a schematic illustration of the transmission of video data in bursts, according to an embodiment of the present disclosure.

There is a need for an improved system and method for managing TWT SP intervals that will adhere to traffic dynamics. FIG. 1 shows a network, in some embodiments, including an access point station 105 and a non-access point station (e.g., a mobile device) 110. FIG. 2 shows bursts 205 of traffic that may result from the transmission of video data including (e.g., consisting of) a plurality of video frames 210. Each burst may be initiated, for example, when a viewer initiates replay of a video on a device (the device including a non-access point station). In some embodiments, a method, employed by a non-access point station, for skipping target wake time service periods, may be advantageous, especially when the network traffic has characteristics like those illustrated in FIG. 2.

In some embodiments, the non-access point station assesses (or "determines") whether a first skipping criterion (discussed in further detail below) is met, and, if the first skipping criterion is met, it skips a first number (e.g., N1, N1 being a positive integer) of target wait time service periods. After skipping N1 target wait time service periods, it may assess whether a second skipping criterion is met, and, if the second skipping criterion is met, it skips a second number (e.g., N2, N2 being a positive integer) of target wait time service periods. The second skipping criterion may be the same as the first skipping criterion (so that assessing whether a second skipping criterion is met means again assessing whether the first skipping criterion is met) or, in some embodiments, the second skipping criterion may differ in some respects from the first skipping criterion.

The first skipping criterion being met may require that (i) a third skipping criterion (discussed in further detail below) is met, that (ii) the non-access point station send to the access point station a target wake time information frame, notifying the access point station of the non-access point station's proposal to skip a number of target wake time service periods, and that (iii) the non-access point station receive an acknowledgment, from the access point station, for the target wake time information frame. In a situation in which the non-access point station is not able to get the channel access to send the target wake time information frame, or does not get the ACK for the Information frame, it discards the skipping possibilities at the current service period (and assesses again, during the next service period, whether the first skipping criterion is met).

The assessing of whether third skipping criterion is met may proceed in different ways in different circumstances. In each case, the assessing of whether third skipping criterion is met may correspond to assessing whether either of the non-access point station and the access point station has (or is likely to have, if the determination cannot be made with certainty) data to be sent to the other. The methods for assessing whether the third skipping criterion is met may, in some embodiments, be broadly grouped into three cases (Case 1, Case 2, and Case 3, each described below) with some of the cases having sub-cases (as discussed in further detail below).

Case 1 corresponds to a situation in which the access point station indicates its buffer status by setting the More Data field both in the quality of service data (Qos Data) frame header and in the acknowledgement (ACK) frame header. It has two subcases, Subcase 1 and Subcase 2.

Subcase 1 of Case 1 may be referred to as Unannounced TWT. In this subcase, the non-access point station checks, toward the end of the service period, whether there are data to be sent in its own buffer, and whether the last More Data bit indicates that the access point station has additional data to send. The non-access point station may, at a point in time preceding the end of the service period by $T_{info}$, (where $T_{info}$ is the maximum amount of time required for the TWT Information frame exchange (e.g., $T_{info}$=the current max back off time+TWT Information frame+SIFS+ACK)), (i) check whether all of its enhanced distributed channel access (EDCA) buffers are empty, and, if the buffers are empty, (ii) check the More Data bit in the last received QoS Data packet of the current service period. If the More Data bit is '0', (i.e., if the access point station no longer has any buffered units (BUs)), the non-access point station determines that the third skipping criterion has been met, and as mentioned above, initiates service period skipping by sending a target wake time information frame to the access point station, notifying the access point station of the non-access point station's proposal to skip a number of target wake time service periods.

Subcase 2 of Case 1 may be referred to as Announced TWT. In this subcase, whenever the non-access point station (i) receives a QoS Data frame from the access point station with a More Data Bit set '0' and with the End of Service Period (EOSP) bit set to '1', or (ii) receives an ACK in response to the QoS Null Data frame with a More Data bit set to '0', it checks whether all of the EDCA buffers of the non-access point station are empty. If all of the EDCA buffers of the non-access point station are empty, the non-access point station determines that the third skipping criterion has been met, and as mentioned above, initiates service period skipping by sending a target wake time information frame to the access point station, notifying the access point station of the non-access point station's proposal to skip a number of target wake time service periods.

Case 2 corresponds to a situation in which the access point station indicates its buffer status by setting the More Data field in the quality of service data (Qos Data) frame header, but not in the acknowledgement frame (ACK frame) header. It has two subcases, Subcase 1 and Subcase 2.

Subcase 1 of Case 2 may (like Subcase 1 of Case 1) be referred to as Unannounced TWT, and it may proceed in the same manner as Subcase 1 of Case 1 (since the method of Subcase 1 of Case 1 does not rely on the More Data field in the acknowledgement frame header, and is therefore unaffected by its not being set in Case 2).

Subcase 2 of Case 2 may (like Subcase 2 of Case 1) be referred to as Announced TWT. In this subcase, whenever the non-access point station either (i) receives a QoS Data frame from the access point station with the More Data bit set to '0' and the EOSP bit set to '1', or (ii) after having sent a QoS Null Data frame, having received an ACK in response, and having then waited during a duration $T_x$ (where $T_x < T_{remaining\_sp\_duration} - T_{info}$), has not received any QoS Data from the access point station, it checks whether all of the EDCA buffers of the non-access point station are empty. If all of the EDCA buffers of the non-access point station are empty, the non-access point station determines that the third skipping criterion has been met, and as mentioned above, initiates service period skipping by sending a target wake time information frame to the access point station, notifying the access point station of the non-access point station's proposal to skip a number of target wake time service periods.

Case 3 corresponds to a situation in which the access point station does not indicate its buffer status using the More Data field at all. In this case, the non-access point station checks, at a point in time $T_{info}$ before the end of the service period, whether all of the EDCA buffers of the non-access point station are empty. If all of the EDCA buffers of the non-access point station are empty, the non-access point station checks (i) whether it has received any QoS Data frames from the access point station during a preceding time interval of length $T_p$, and (ii) whether the channel was clear during that time interval, where $T_p$ is bounded as follows:

$$cw\_max[BK]*slot\ time + AIFSN[BK]*slot\ time + SIFS \leq T_p \leq T_{sp\_duration} - T_{info},$$

where cw_max[BK] is a maximum contention window length for background access category, and AIFSN[BK] *slot time+SIFS is the arbitration inter-frame spacing for background access category.

If both conditions are met, the non-access point station determines that the third skipping criterion has been met, and as mentioned above, initiates service period skipping by sending a target wake time information frame to the access point station, notifying the access point station of the non-access point station's proposal to skip a number of target wake time service periods.

The number of service periods to be skipped may be set to an initial value, e.g., 1, whenever the first skipping criterion is first met (after data was transmitted, in either direction, between the non-access point station and the access point station), and then increased in each subsequent service period in which the non-access point station wakes up and the first skipping criterion is still met, up to a maximum threshold amount. In some embodiments it is increased exponentially, e.g., doubled each time. As such, if N1, N2, and N3 are the number of service periods to be skipped on three consecutive occasions that the first skipping criterion is met, it may be the case that N3/N2=N2/N1=2, or, for an exponential increase by a factor differing somewhat from 2, or for an increase that is approximately equal to an exponential increase, it may be the case that N3/N2 is between 0.5 N2/N1 and 4 N1/N2.

In other embodiments the number of service periods to be skipped is increased according to another function, e.g., linearly with time, or according to a polynomial function of the number of successive occasions on which the first skipping criterion is met. When the maximum threshold number is reached, the number of service periods to be skipped may be left constant at that value.

If the non-access point station has not established an agreement with the access point station for Target Beacon Transmission Time (TBTT), and the last Beacon reception time exceeds a threshold value $T_b$, the non-access point station may wake up for a short duration $T_a$ to receive the beacon. In some embodiments, this does not affect the skipping of any service periods that may be in progress.

Skipping of service periods may be terminated when the non-access point station enqueues a new buffered unit or the non-access point station receives a QoS Data frame from the access point station. As mentioned above, when the first skipping criterion is next satisfied after skipping of service periods has been terminated, the number of service periods to be skipped may again be set to the initial value. Pseudo code for such a method of selecting the number of service periods to be skipped is shown in FIG. 3. FIGS. 4A and 4B show Adaptive TWT Operation in Unannounced TWT, with the legend of FIG. 4C applying to both FIG. 4A (illustrating the "fixed" case in which no target wake time service periods are skipped) and FIG. 4B (in which some target wake time service periods (shown as dashed boxes in FIG. 4B) are skipped).

FIGS. 5A to 7B show simulation results for a performance analysis simulation according to FIGS. 1 and 2. The simulation assumes that the traffic type is buffered video streaming (e.g. YouTube), and it assumes that the circumstances of Case 1 are present, i.e., the access point station indicates its buffer status by setting the More Data field in QoS Data and ACK. It assumes that the network consists of one access point station and one non-access point station, and that current consumption occurs from a 4 V power supply. The physical layer (PHY) is assumed to be 20 MHz bandwidth, constant rate (no link adaptation) transmission at MCS 5 (52 Mbps). Traffic parameters are assumed to correspond to a buffered video streaming traffic model, in which every 5 seconds, a traffic burst is generated that lasts for 250 ms (milliseconds), the total number of traffic bursts is 100, and the overall traffic generation time is 5%. Simulation run time is 502 seconds, the initial setup (Association, TWT establishment etc.) time is 2.12 seconds, and the effective run time is 500 seconds.

Figure 5A:
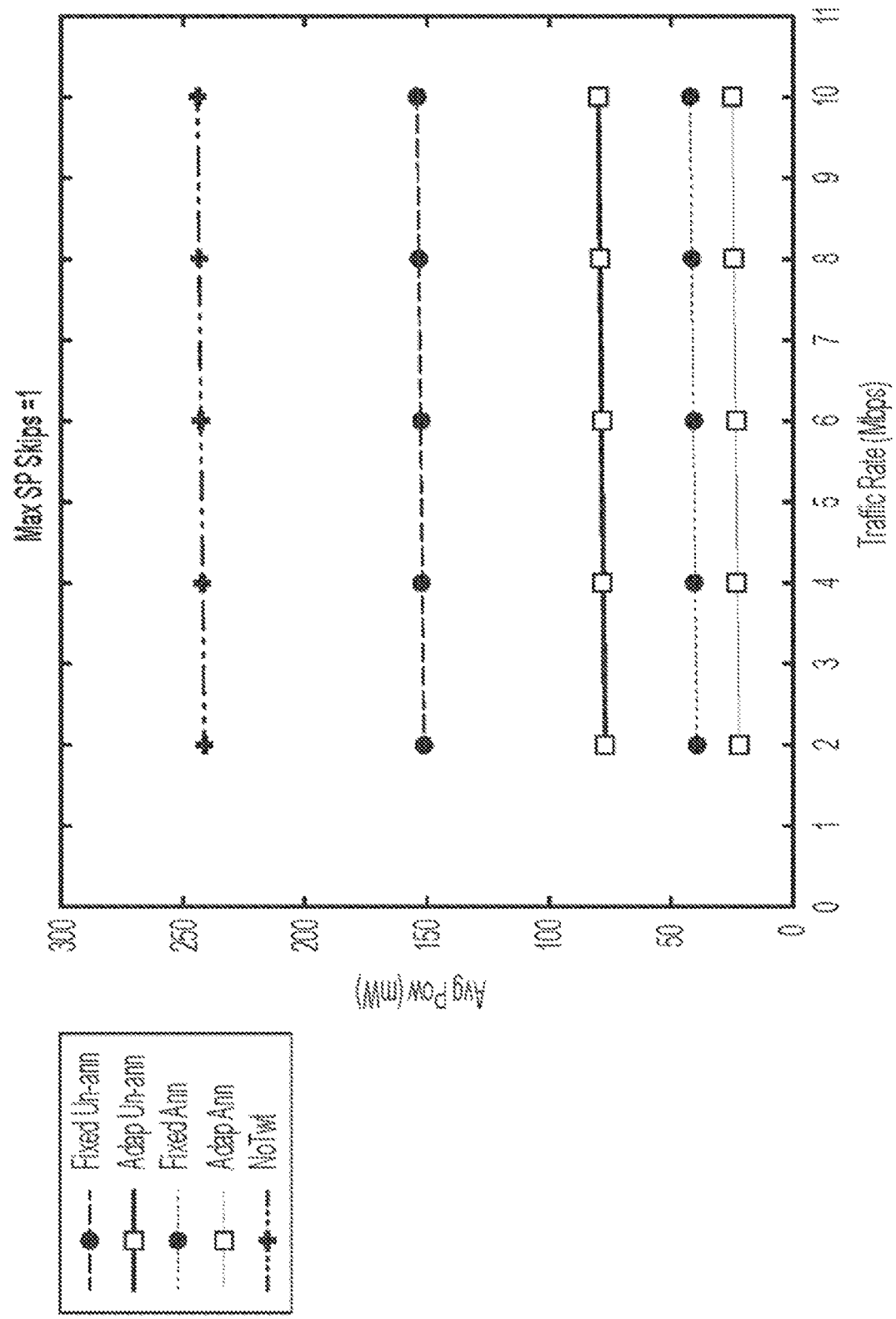
FIG. 5A is a graph showing results from a performance simulation, according to an embodiment of the present disclosure.
Figure 5B:
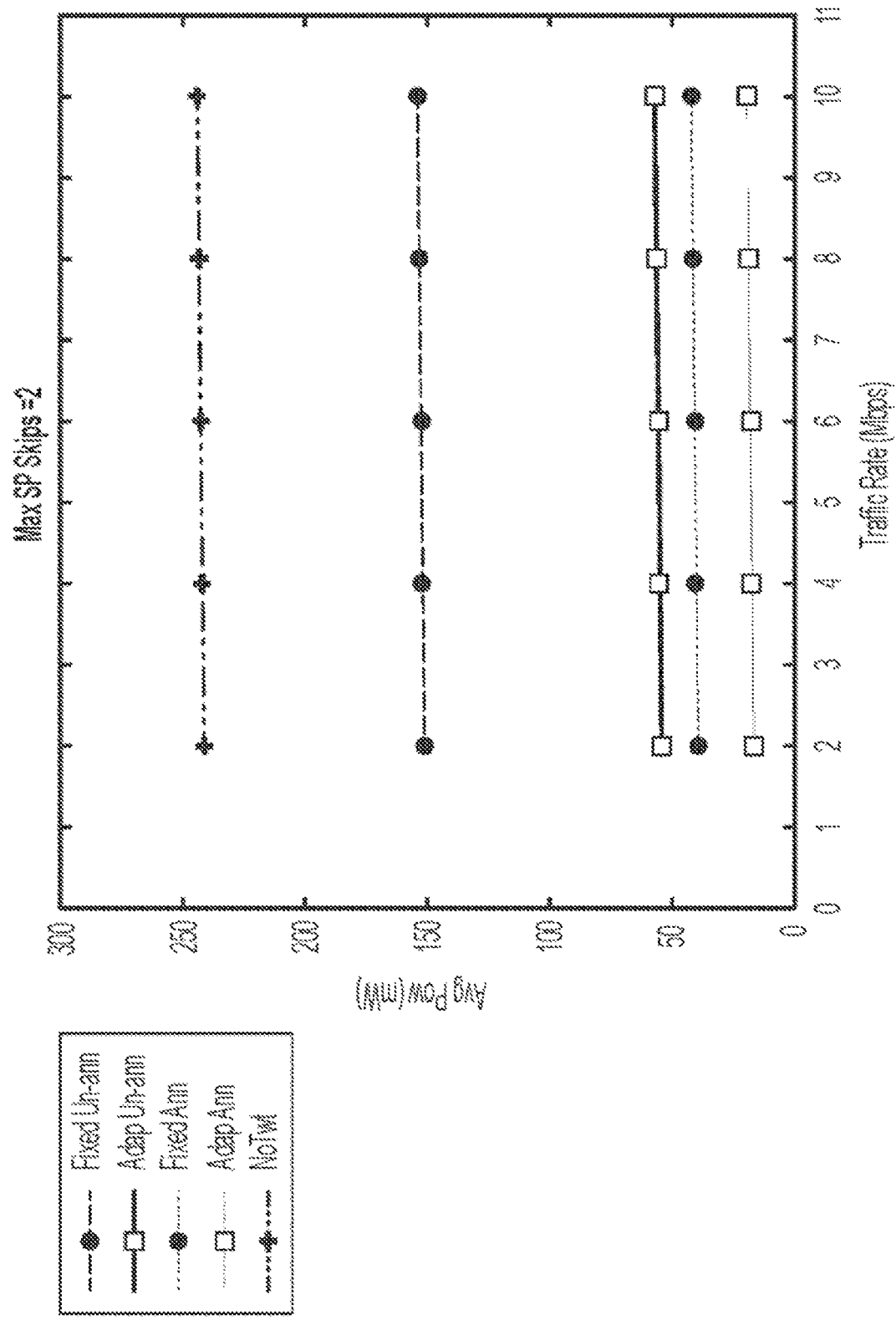
FIG. 5B is a graph showing results from a performance simulation, according to an embodiment of the present disclosure.
Figure 5C:
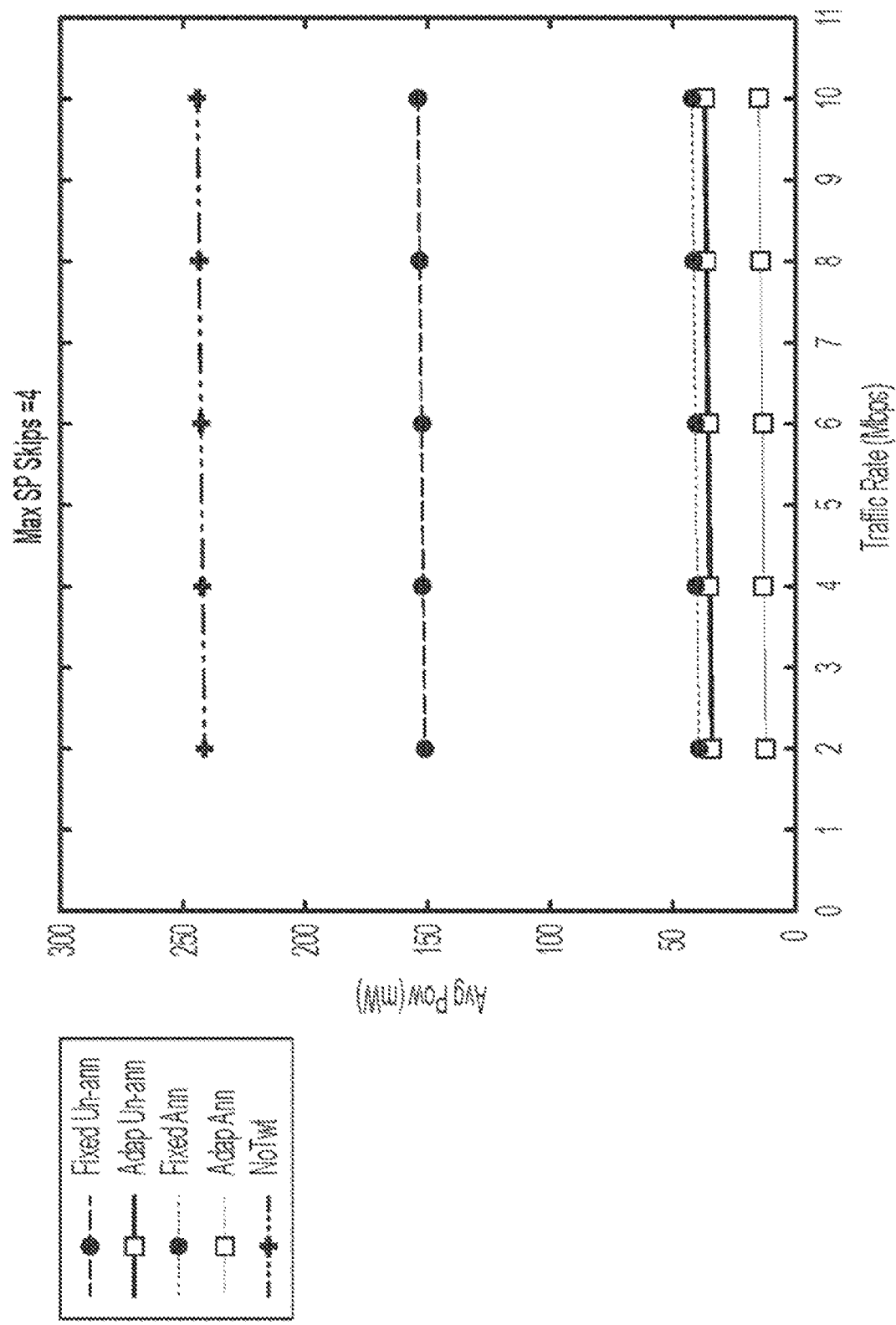
FIG. 5C is a graph showing results from a performance simulation, according to an embodiment of the present disclosure.

FIGS. 5A-5C show the results of a power consumption analysis for the simulation. It may be seen from FIGS. 5A-5C that for lower traffic (2 Mbps) and a larger maximum number of target wake time service period skips (4), adaptive unannounced target wake time service period skipping may reduce power consumption by up to 78% whereas announced TWT may reduce power consumption by 71%, compared to fixed operation. When traffic increases or when the maximum target wake time service period skips is decreased, the performance improvement is reduced because of fewer opportunities to skip target wake time service periods.

Figure 6A:
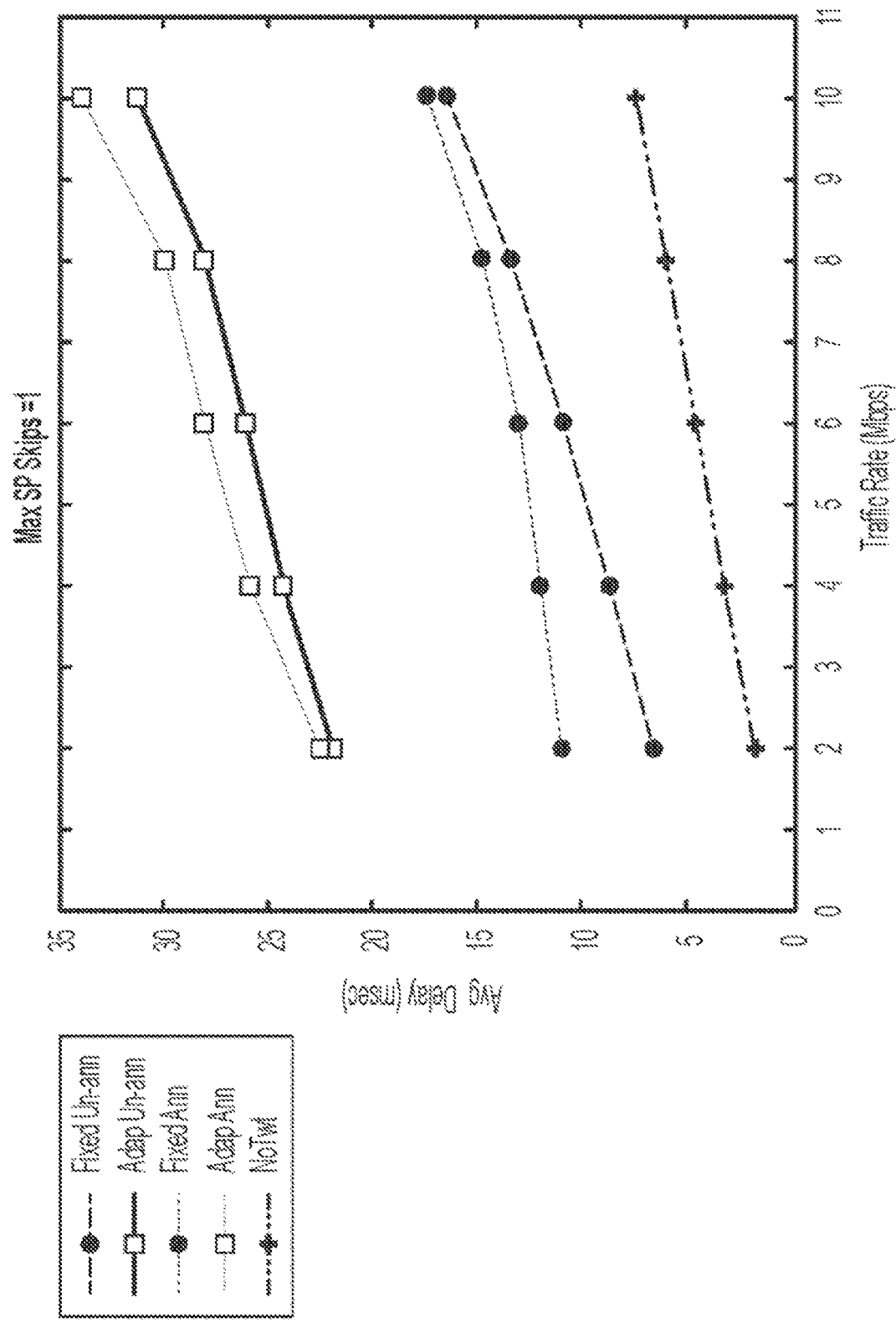
FIG. 6A is a graph showing results from a performance simulation, according to an embodiment of the present disclosure.
Figure 6B:
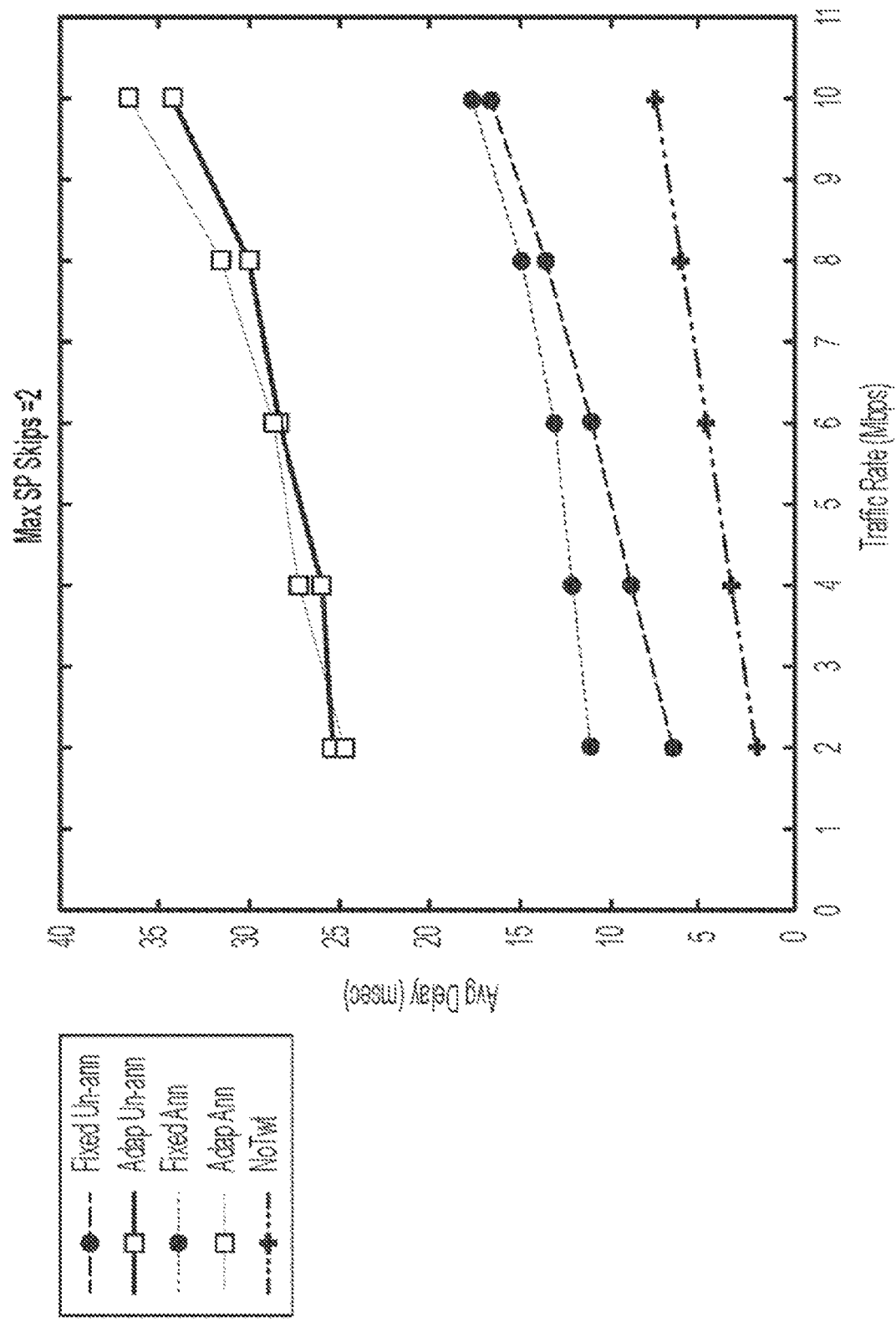
FIG. 6B is a graph showing results from a performance simulation, according to an embodiment of the present disclosure.
Figure 6C:
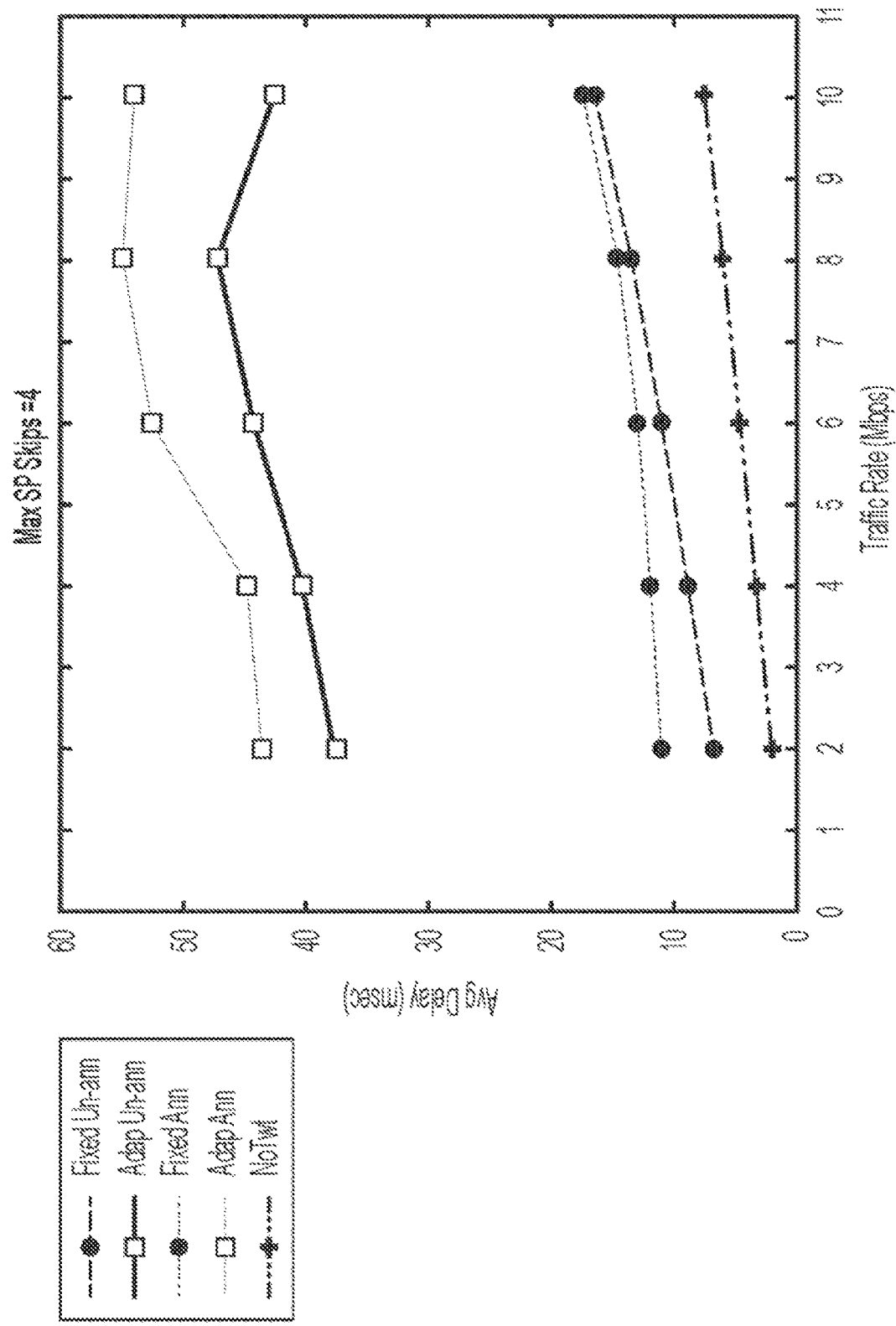
FIG. 6C is a graph showing results from a performance simulation, according to an embodiment of the present disclosure.
Figure 7A:
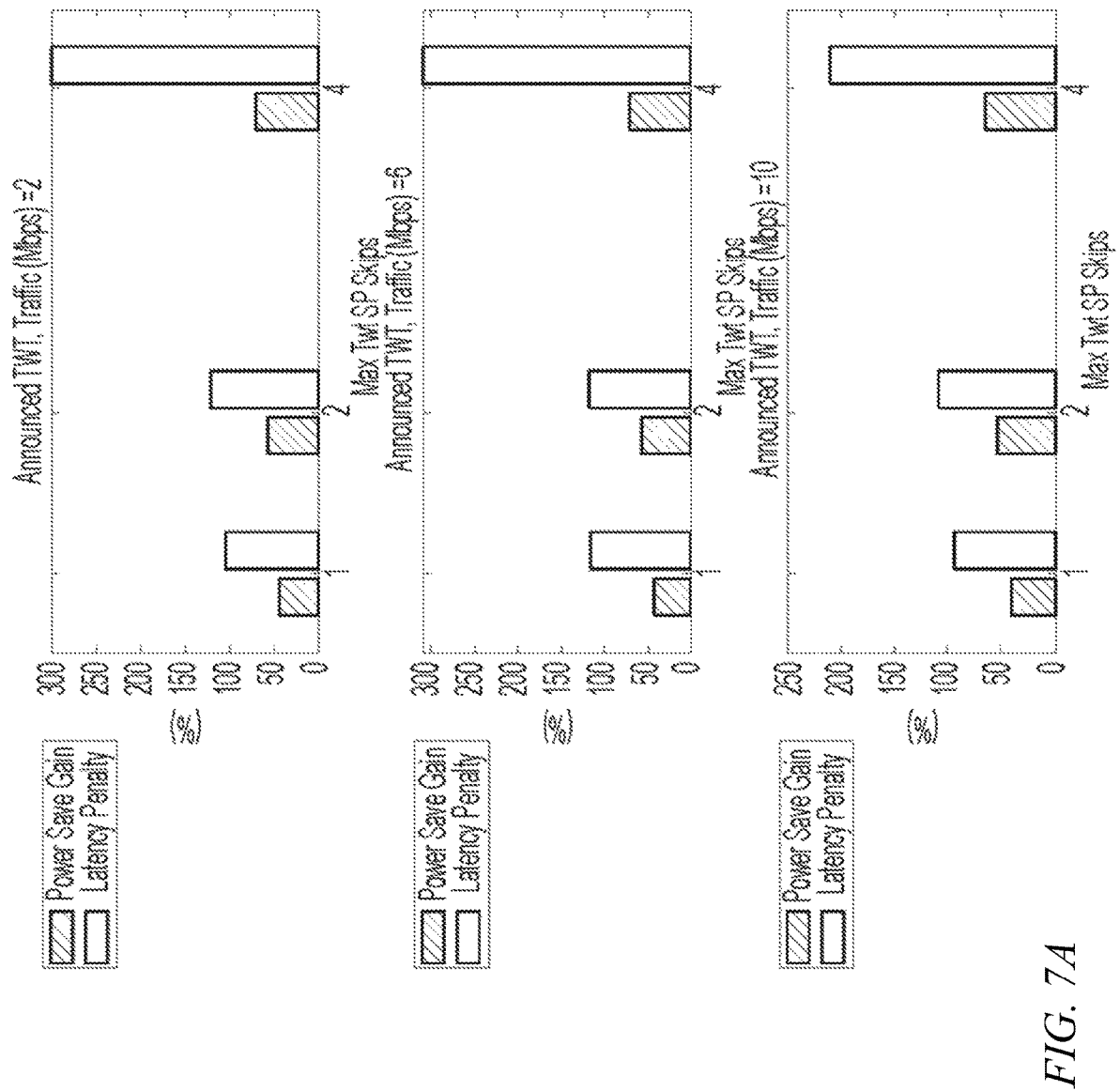
FIG. 7A is a graph showing results from a performance simulation, according to an embodiment of the present disclosure.
Figure 7B:
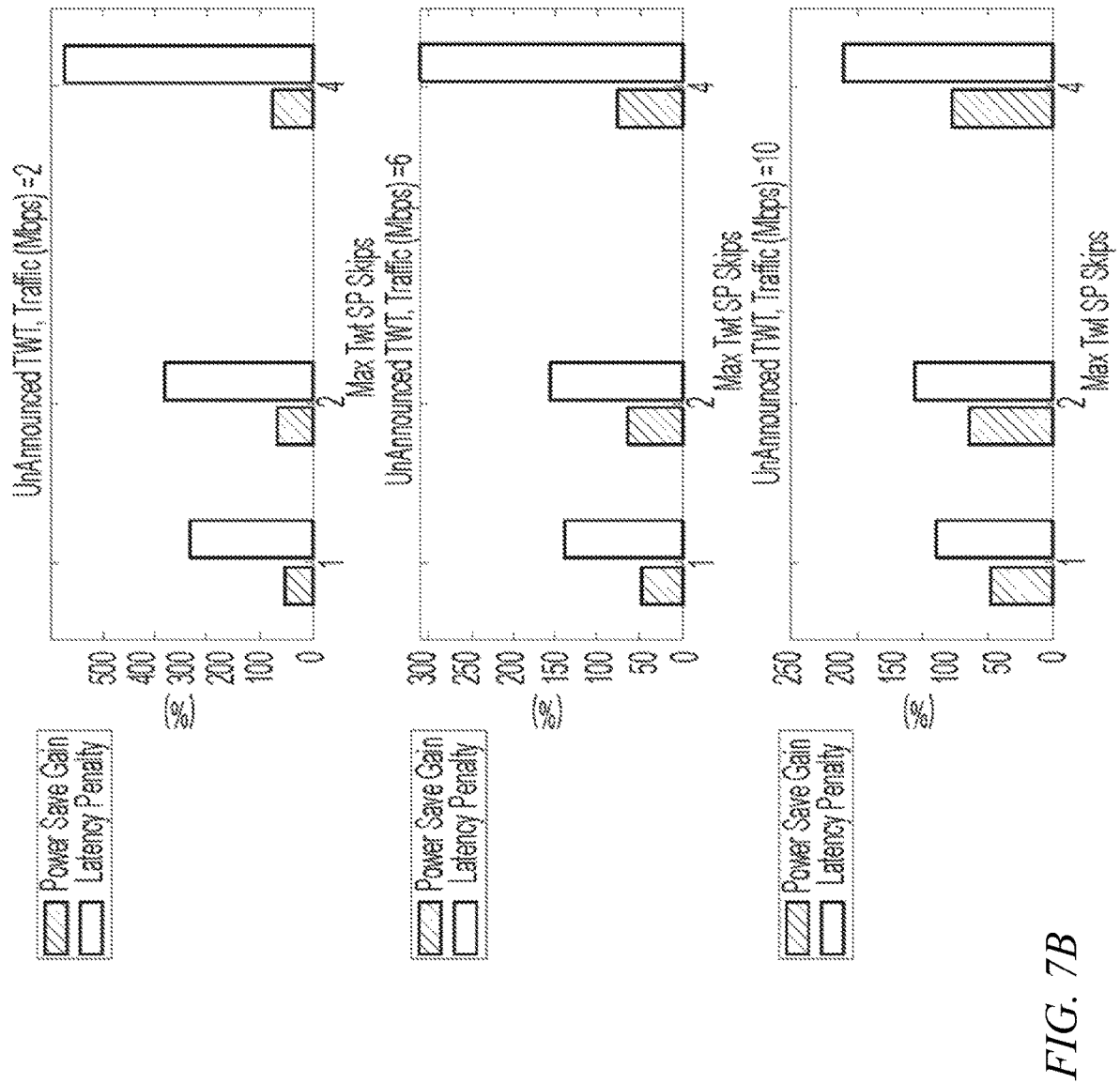
FIG. 7B is a graph showing results from a performance simulation, according to an embodiment of the present disclosure.

FIGS. 6A-6C show the results of a latency analysis for the simulation. It may be seen from FIGS. 6A-6C that for lower traffic (2 Mbps) and a larger maximum number of target wake time service period skips (4), the latency in target wake time service period skipping may increase from 10.95 ms to 43.87 ms. When the maximum number of target wake time service period skips is limited to 1, the latency for the adaptive case is increased only to 22.43 ms. As such the maximum number of target wake time service period skips may be adjusted based on an application's latency tolerance. FIGS. 7A and 7B illustrate the tradeoff between power savings and latency penalty.

In an alternative approach to some embodiments described above, a skipping process (Adaptive TWT) may involve setting up multiple TWT agreements of different duration and interval simultaneously and then hopping in between TWT agreements based on the traffic demand. In particular, the method may proceed as follows.

While establishing the TWT, instead of setting up one TWT agreement, the method may set up as many TWT agreements as possible at the same time (up to 8). If the first TWT agreement's minimum SP wake duration and the interval is represented by the pair $(T_{SP}, T_{int})$, then some of the TWT agreements may have $(T_{SP}, nT_{int})$ pairs that may be used to save power and the others may have $(\alpha T_{SP}, \beta T_{int})$ pairs that may be used to adjust to varying traffic types.

After detecting the end of a traffic burst, the method may send a frame similar to a TWT Information frame to pause the ongoing TWT SP and resume another TWT SP from the $(T_{SP}, nT_{int})$ pair set whose n is higher than the ongoing TWT SP. If the start of a traffic burst is detected (e.g., when the non-access point station enqueues a new buffered unit or the non-access point station receives a QoS Data frame from the access point station), the method may pause the ongoing TWT (using the pair $(T_{SP}, nT_{int})$), and fall back to base $(T_{SP}, T_{int})$.

Traffic generating applications, e.g., video-viewing applications, or voice over IP applications, may be running at the non-access point station, which may therefore be able to detect a change in the traffic. Information regarding changes in the traffic may be provided by the application layer of the non-access point station to the MAC layer of the non-access point station and may be utilized in the algorithm. Whenever the ongoing traffic is changed (e.g., VoIP to Video Streaming to HTTP), the method may send a frame similar to a TWT Information frame to pause the ongoing TWT SP and resume another TWT SP such that $$(\text{Mean traffic burst duration} - \alpha T_{SP})^2 + (\text{Mean traffic burst interval} - \beta T_{int})^2$$

is minimized. This cost function may adjust service periods to the traffic characteristics such that traffic burst durations are as close as possible to service period durations and traffic burst intervals are close to service period intervals as possible.

In some embodiments, methods described herein may be performed by a processing circuit, e.g., a processing circuit in a non-access point station or in an access point station. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of some embodiments.

The terminology used herein is for the purpose of describing particular embodiments only and is not intended to be limiting of some embodiments. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for managing target wake time service period intervals have been specifically described and illustrated herein, many modifications and variations will be apparent to those skilled in the art. For example, in some embodiments, a system or method as disclosed herein may be used in a sensor network or in a Zigbee system, or as an extension to Li-Fi. Accordingly, it is to be understood that a system and method for managing target wake time service period intervals constructed according to principles of this disclosure may be embodied other than as specifically described herein. Some embodiments are also defined in the following claims, and equivalents thereof.

What is claimed is:

1. A method for communicating over a WiFi channel, the method comprising:
   receiving, from an access point station, an indication of buffer status of the access point station;
   determining, by a non-access point station, that a first skipping criterion is met;
   in response to determining that the first skipping criterion is met, skipping N1 target wait time service periods, N1 being a positive integer;
   after skipping N1 target wait time service periods, determining, by the non-access point station, whether a second skipping criterion is met; and
   in response to determining that the second skipping criterion is met, skipping N2 subsequent target wait time service periods, N2 being a positive integer greater than N1,
   wherein:
      the determining, by the non-access point station, that the first skipping criterion is met, comprises determining, by the non-access point station, whether a third skipping criterion is met; and
      the determining, by the non-access point station, whether the third skipping criterion is met, comprises:
         determining whether all enhanced distributed channel access buffers of the non-access point station are empty, and
         determining whether the buffer status of the access point station indicates that the access point station has no buffered units.

2. The method of claim 1, wherein the second skipping criterion is the same as the first skipping criterion.

3. The method of claim 1, further comprising, after skipping N2 target wait time service periods:
   determining, by the non-access point station, whether the second skipping criterion is met; and
   in response to determining that the second skipping criterion is met, skipping N3 subsequent target wake time service periods, N3 being a positive integer greater than N2,
   N3/N2 being between 0.5 N2/N1 and 4 N1/N2.

4. The method of claim 3, wherein N2/N1 is 2.

5. The method of claim 1, wherein the determining, by the non-access point station, that the first skipping criterion is met further comprises:
   in response to determining that the third skipping criterion is met, sending, by the non-access point station to an access point station, a target wake time information frame, notifying the access point station that N1 target wake time service periods are to be skipped; and receiving, by the non-access point station, an acknowledgment, from the access point station, for the target wake time information frame.

6. The method of claim 5, wherein the determining, by the non-access point station, whether the third skipping criterion is met, comprises:
at a point in time preceding a current service period end by a maximum amount of time required for a target wake time frame exchange, determining:
determining whether all enhanced distributed channel access buffers of the non-access point station are empty; and
during a preceding time interval:
the channel has been clear, and
no quality of service data frames have been received from the access point station.

7. The method of claim 6, wherein the preceding time interval has a length less than the sum of:
an arbitration inter-frame spacing for background, and
the product of:
a maximum contention window length for background and
a slot time.

8. The method of claim 1, wherein the indication of buffer status of the access point station is a value of a more data bit in a quality of service data frame header.

9. The method of claim 1, wherein the indication of buffer status of the access point station is a value of a more data bit in a quality of service data frame header.

10. The method of claim 1, further comprising receiving, from the access point station, a quality of service data frame having an end of service period bit set to 1.

11. The method of claim 1, further comprising waiting, by the non-access point station, until a point in time preceding a current service period end by a maximum amount of time required for a target wake time frame exchange, before the determining whether all enhanced distributed channel access buffers of the non-access point station are empty.

12. A system for communicating over a WiFi channel, the system comprising a non-access point station comprising a processing circuit, the processing circuit being configured to:
receive, from an access point station, an indication of buffer status of the access point station;
determine that a first skipping criterion is met;
in response to determining that the first skipping criterion is met, skip N1 target wait time service periods, N1 being a positive integer;
after skipping N1 target wait time service periods, determine whether a second skipping criterion is met; and
in response to determining that the second skipping criterion is met, skip N2 subsequent target wait time service periods, N2 being a positive integer greater than N1,
wherein:
the determining that the first skipping criterion is met comprises determining whether a third skipping criterion is met; and
the determining whether the third skipping criterion is met comprises:
determining whether all enhanced distributed channel access buffers of the non-access point station are empty, and
determining whether the buffer status of the access point station indicates that the access point station has no buffered units.

13. The system of claim 12, wherein the second skipping criterion is the same as the first skipping criterion.

14. The system of claim 12, wherein the processing circuit is further configured to:
after skipping N2 target wait time service periods, determine whether the second skipping criterion is met; and
in response to determining that the second skipping criterion is met, skip N3 subsequent target wake time service periods, N3 being a positive integer greater than N2,
N3/N2 being between 0.5 N2/N1 and 4 N1/N2.

15. The system of claim 14, wherein N2/N1 is 2.

16. The system of claim 12, wherein the determining that the first skipping criterion is met further comprises:
in response to determining that the third skipping criterion is met, sending to an access point station a target wake time information frame, notifying the access point station that N1 target wake time service periods are to be skipped; and
receiving an acknowledgment, from the access point station, for the target wake time information frame.

17. The system of claim 12, wherein the indication of buffer status of the access point station is a value of a more data bit in a quality of service data frame header.

18. A method for communicating over a WiFi channel, the method comprising:
receiving, from an access point station, an indication of buffer status of the access point station;
determining, by a non-access point station, that a first skipping criterion is met;
in response to determining that the first skipping criterion is met, switching from a first target wake time agreement to a second target wake time agreement, different from the first target wake time agreement;
determining, by the non-access point station, whether a second skipping criterion is met; and
in response to determining that the second skipping criterion is met, switching from the second target wake time agreement to a third target wake time agreement, the third target wake time agreement being different from the first target wake time agreement, and the third target wake time agreement being different from the first target wake time agreement,
wherein:
the determining, by the non-access point station, that the first skipping criterion is met, comprises determining, by the non-access point station, whether a third skipping criterion is met; and
the determining, by the non-access point station, whether the third skipping criterion is met, comprises:
determining whether all enhanced distributed channel access buffers of the non-access point station are empty, and
determining whether the buffer status of the access point station indicates that the access point station has no buffered units.

* * * * *